(12) United States Patent
McDonald

(10) Patent No.: US 7,752,802 B2
(45) Date of Patent: Jul. 13, 2010

(54) FIRE ANT COLONY KILLER

(76) Inventor: Ken McDonald, 291 FM 3164, Gainesville, TX (US) 76240

( * ) Notice: Subject to any disclaimer, the term of this patent is extended or adjusted under 35 U.S.C. 154(b) by 0 days.

(21) Appl. No.: 12/462,303

(22) Filed: Aug. 3, 2009

(65) Prior Publication Data

US 2009/0293343 A1 Dec. 3, 2009

Related U.S. Application Data

(63) Continuation-in-part of application No. 11/708,753, filed on Feb. 21, 2007, now abandoned.

(51) Int. Cl.
*A01M 19/00* (2006.01)
(52) U.S. Cl. ............... 43/130; 43/129; 43/138; 43/132.1
(58) Field of Classification Search ............ 43/130, 43/129, 140, 138, 144, 132.1
See application file for complete search history.

(56) References Cited

U.S. PATENT DOCUMENTS

| | | | | | |
|---|---|---|---|---|---|
| 3,982,351 | A | * | 9/1976 | Waldron | 43/129 |
| 4,637,161 | A | * | 1/1987 | Turner | 43/130 |
| 4,815,234 | A | * | 3/1989 | Connolly | 43/132.1 |
| 5,031,355 | A | * | 7/1991 | Ryan | 43/130 |
| 5,154,018 | A | * | 10/1992 | Livingston | 43/125 |
| 5,319,878 | A | * | 6/1994 | Moffett et al. | 43/124 |
| 5,501,032 | A | * | 3/1996 | Pitman | 43/129 |
| 6,026,609 | A | * | 2/2000 | Rawls | 43/124 |
| 6,029,589 | A | * | 2/2000 | Simpson | 111/7.2 |
| 2007/0056209 | A1 | * | 3/2007 | Schuster | 43/132.1 |
| 2007/0137095 | A1 | * | 6/2007 | Chen | 43/132.1 |

* cited by examiner

*Primary Examiner*—Christopher P Ellis
(74) *Attorney, Agent, or Firm*—Arthur W. Fisher

(57) ABSTRACT

A system for exterminating insects and several embodiments thereof are presented. Steam is generated and transported to a movable applicator. The applicator is positioned over a designated area of ground and the steam is applied exterminating the insects on and/or under the designated area of ground.

19 Claims, 2 Drawing Sheets

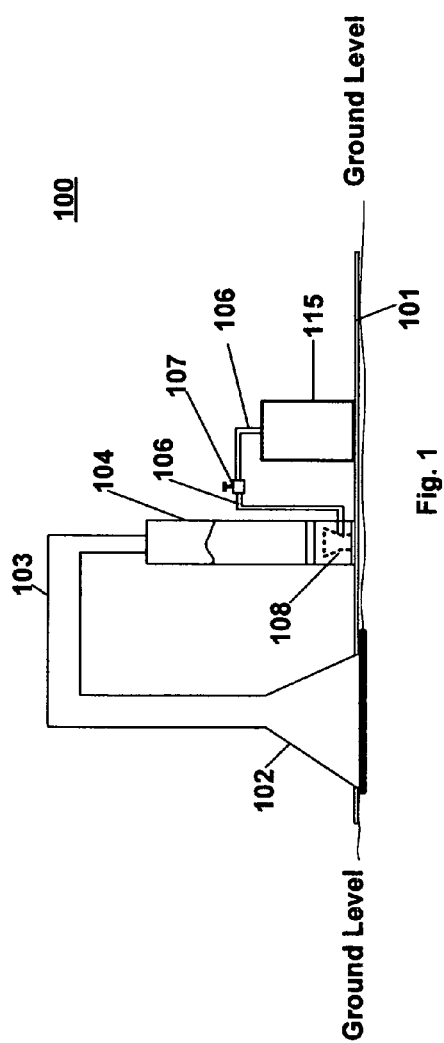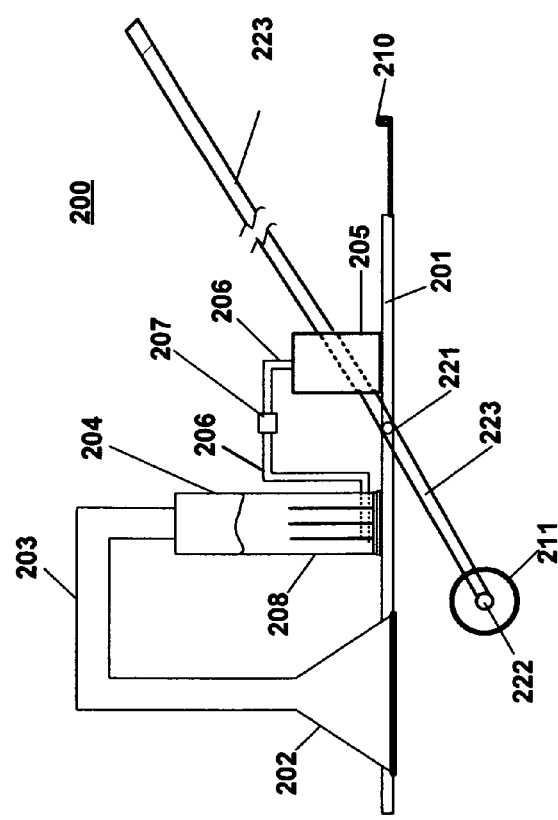

FIRE ANT COLONY KILLER

This application is a Continuation in Part application of existing patent application Ser. No. 11/708,753 of the same title filed Feb. 21, 2007 now abandoned. Applicant hereby claims the priority filing date of Feb. 21, 2007 for all but new matter in the instant application.

BACKGROUND OF THE INVENTION

Description of the Related Art

Insect extermination, particularly for undesirable external insects, has been largely confined to chemical treatments. Zappers are used for certain flying insects. These chemical treatments are often ineffective and always create environmental and health concerns.

Fire ants, in particular, are very aggressive and their bites are always hurtful and sometimes dangerous. The usual result from a chemical treatment is that the colony relocates. Often, they become even more aggressive as a result.

One treatment often employed to exterminate fire ants is to pour boiling water on the colony bed. However, this treatment is often only partially effective and rarely kills the queen ants. Fire ants and other insects prepare an elaborate system or network of tunnels to get from the nest to the ground surface. The boiling water has the effect of collapsing these tunnels and thus shielding ants below from harm. Steam has also been used but applied with a probe that has to be forced into the ground. This approach is not very effective since if one does not directly hit the queen, the results will not be good. Additionally, these probes are often difficult to use requiring considerable force to insert them deep into the ground.

Thus, there is a need in the art for a method and apparatus for a completely effective and easy system for exterminating insects, particularly fire ants, and safe, both environmentally and for human and animals.

SUMMARY OF THE INVENTION

A method and apparatus for an extermination system mechanized for exterminating insects on and under a designated area of ground comprising a boiler with liquid; a power source for heating the liquid and converting the liquid to steam in the boiler; a steam transport system for delivering steam from the boiler, an applicator for placement on to and over the designated area of ground such that steam from the boiler is applied on to the designated area and into insect tunnel networks without forcing a probe into the ground; wherein the steam transport system and the applicator are configured so that the pressure and temperature of the steam is maintained low enough such that, when the applicator is placed on the designated area of ground, the steam will not damage or collapse the insect tunnel networks; and wherein, when the applicator is placed on the designated area of ground, insects on the designated area of ground under the applicator are exterminated directly by the steam and insects underground are exterminated, without the use of a probe, by the steam entering into the tunnel network at the ground surface on the designated area of ground and traveling underground through the tunnel network.

The method and apparatus as described above wherein the liquid in the boiler is water.

The method and apparatus as described above system wherein the mechanism for raising and lowering the applicator is thermally isolated from the exterminator such that an operator will not be burned.

The method and apparatus as described above wherein the mechanism for raising and lowering the applicator on to the designated area of ground is manually operated.

The method and apparatus as described above further comprising a power means for automated raising and lowering of the applicator.

The method and apparatus as described above wherein the mechanism for manually lowering and raising may be used for transporting the system.

The method and apparatus as described above wherein the system is configured such that a seal is created between the bottom perimeter of the applicator and the ground when the applicator is lowered preventing or minimizing steam from escaping directly into the air.

The method and apparatus as described above further comprising a sensor for sensing the amount of liquid in the boiler.

The method and apparatus as described above further comprising a shut-off device coupled to the sensor for shutting off the power source when the liquid level has dropped to pre-determined level.

The method and apparatus as described above wherein the power source further comprises a burner for heating the liquid and converting the liquid into steam; and a fuel source coupled to the burner for delivering fuel to the burner.

The method and apparatus as described above system as set forth in claim 10 further comprising an igniter for igniting the fuel at the burner.

The method and apparatus as described above further comprising wherein the fuel is a gas.

The method and apparatus as described above wherein the power source comprises one or more electrically powered electrodes immersed in the boiler for converting the water into steam.

The method and apparatus as described above further comprising system transport means for transporting the system to and from designated areas of ground.

The method and apparatus as described above further comprising a control panel for remotely operating and/or monitoring the system.

The method and apparatus as described above wherein no insecticidal fog is used.

BRIEF DESCRIPTION OF THE DRAWINGS

FIG. 1 is a side cross-sectional view of the mechanized insect exterminator with a steam producer powered by gas.

FIG. 2 is a side cross-sectional view of the mechanized insect exterminator with an electrically powered steam producer and apparatus for manually lowering and raising the applicator.

DETAILED DESCRIPTION

Figure 3:
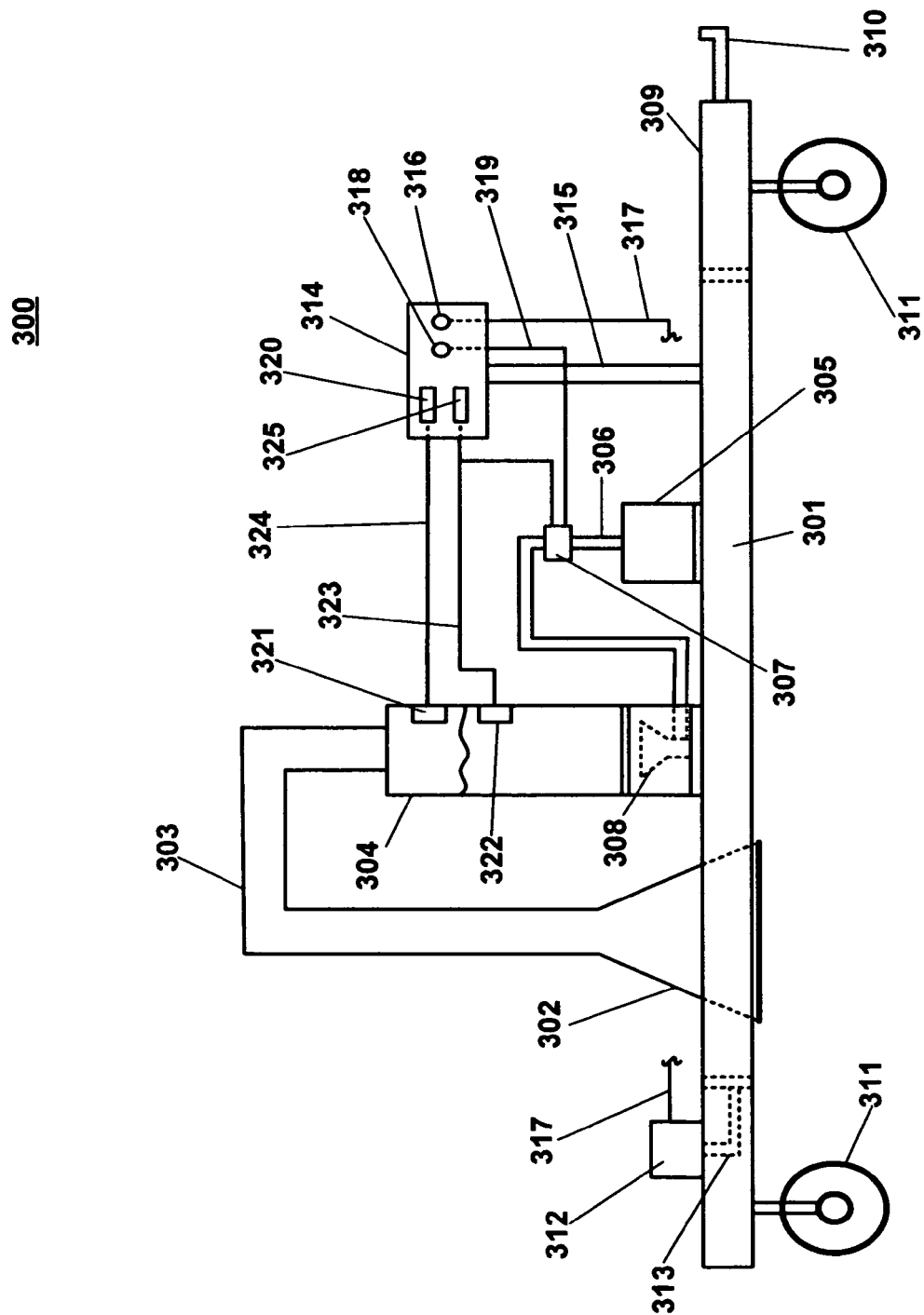
FIG. 3 is a side cross-sectional view of the mechanized insect exterminator with additional transport and operational apparatus.

Whilst the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not limit the scope of the invention. Moreover, the present invention, while described for the extermination of fire ants and fire ant colonies, may be utilized to exterminate a wide variety of insects.

Referring now to FIG. 1, a side, cross-sectional view of the exterminator 100 is depicted. The apparatus is affixed to a base 101. The base 101 is made of durable material, such as steel, for example, and may be of any size, depending on the size of the apparatus to be secured on it. It will be appreciated that any suitable material may be used for the base 101. In the instant embodiment, the base 101 is heavy which will assist in the application of the steam to the insect colony.

The boiler 104 includes a burner 108 disposed at the bottom of the boiler 104 for heating the liquid into steam inside the boiler 104. Although the liquid is preferably is water, it will be appreciated and understood that the present invention also embodies other liquids to be converted into steam and/or other substances that could be added to the liquid. The boiler 104 should have a safe and easy method (not shown) for replenishing the fuel. It will be understood that the cubic capacity of the boiler may vary as desired. Smaller capacities take less time to be converted to steam while large capacities will last longer for more applications without the need for replenishing the steam source (e.g. water). For example, a boiler having a capacity of approximately 314 cubic inches has been found to be a useful size. While not requiring much time or fuel to heat up, as many as 10-12 applications on fire ant colonies can be achieved without replenishing the water in the boiler. 104.

A conduit 106 connects the burner 108 to a heating fuel source 105 secured to the base 101. A valve 107 is used to control to flow of heating fuel from the source 105 to the burner 108. as depicted in FIG. 1, the heating fuel source 105 is a replaceable and/or refillable canister with a gas such as propane. It will be appreciated that any suitable heating fuel may be used with the present invention and it is not limited to propane. Moreover, the heating fuel source 105 need not be canister nor need not be secured to the base 101. For portability, it is preferable to have a heating fuel source that is easily transported from place to place.

A steam transport 103 transports steam to the applicator 102 from a boiler 104 secured to the base 101. The steam transport 103 may be made from any suitable material and may be of any suitable shape and size. The steam transport 103 should have sufficient internal passageway area that will allow ample volume of steam to pass through to the applicator 102 without any significant increase the steam pressure. This is dependent on the size and steam volume output of the boiler. For example, for a boiler such as that described above having a capacity of approximately 314 cubic inches, an internal passageway area for the steam transport 103 of 8-10 square inches is preferable and will result in minimal increase in steam pressure. Moreover, this size will aptly work with boilers having considerably larger or smaller capacities.

The steam transport 103 may be permanently secured to the boiler 104 and/or the applicator 102. Alternately, it may be detachable from the applicator 102 so that, for example, the applicator 102 may be replaced or so that different size applicators may be used. Similarly, the steam transport may be detachable from the boiler 104 so, for example, the boiler can be replaced or that multiple boilers 104 can be secured to the base 101 and used with the same applicator 102. It will further be appreciated that the steam transport 103 may be rigid or flexible.

An applicator 102 for steam is secured to and through the base 101 and is depicted in FIG. 1 as extending below the bottom surface of the base. The applicator 102 may be made of any suitable material such as steel so long as it is able to tolerate the temperatures of the steam. A material that is heavy and weather and rust resistant is preferable. The applicator 102 is shown as an inverted, open and hollow circular hood or cover. It will be understood that the applicator 102 may be of any suitable size and shape. The opening at the bottom of the applicator 102 will be mainly determined by the size of the designated area of ground to be covered. However, it should not be smaller the area of the steam transport 103 so as not to increase the pressure of the steam and not so large as to lower the steam pressure or temperature substantially or otherwise dissipate the steam. large enough to cover most fire ant colony mound sis large enough to cover a sufficient portion of the insect bed and the area of the applicator is sufficiently large but not so large as to significant Consequently, the applicator coverage area should be substantially larger than the internal passageway area of the steam transport. For example, for a steam transport 103 having an internal passageway (for the steam) area of 8 to 10 square inches, an opening area of the applicator 102 in the range of 37-40 square inches has been found to be preferable. This area is large enough to cover most fire ant colony insect mounds while maintaining appropriate steam temperatures and pressures. It will be understood, however, that any number of sizes and shapes will be suitable for the applicator 102 so long the applicator does not substantially increase the steam pressure or substantially lower the steam temperature.

It will be appreciated and understood that the present invention is not limited to the configuration described above. For example, the applicator 102 need not be secured to the base 101 and capable of separately being moved into position over the designated area of ground to be treated independent of the base 101 and other apparatus secured to the base.

In the instant embodiment of the present invention, the applicator 102 is shown extending below the bottom surface of the base 101. In operation, it is desirable to insure that the applicator 102, when positioned over the insect bed, will extend slightly into the ground surface thereby preventing or, at least, minimizing steam from escaping from the sides of the applicator 102 directly into the air. Thus, the bottom perimeter of the applicator is forming a seal with the ground to prevent or, at least minimize steam from escaping into the air. In the instant embodiment of the present invention, the base 101 is lowered on to the ground such that the applicator 102 covers the designated area of ground to be treated. The weight of the base 101, all of the apparatus secured to the base 101, and the applicator 102 all serve to force the applicator 102 into the ground to ensure maximum application of the steam on to and into the designated area of ground to be treated.

The primary target of the instant invention are the insects, including the queen, under ground. The present invention utilizes the fine network of tunnels the insects create to get to and from ground surface. Specifically, steam is forced into the tunnel network and completely permeates this network exterminating the queen and the other insects as well. Consequently, it is necessary to insure that the steam will not collapse or otherwise damage the tunnel network preventing the steam from reaching all of the target insects. To insure this, the steam of the instant invention has virtually no liquid content, which would collapse the insect tunnel network, and the pressure of the steam is maintained at very low levels. Also, the temperature of the steam is also maintained so that it does not drop substantially losing its effectiveness to destroy the insects.

The amount of acceptable steam pressure is dependent on the size of the tunnels in the network. For example, there are numerous types of fire ant species and some are much larger than others. For fire ants, the steam pressure inside the applicator will preferably be maintained in a 0.1 psi to 0.3 psi range above normal atmospheric pressure. For larger insects that make larger tunnels, a slightly higher range of steam pressure may be preferable. Similarly, higher temperatures are not desirable either as they tend to increase the pressure. More importantly, the steam temperature can not be allowed to substantially drop and lose its effectiveness for destroying the insects. Preferably, the temperature within the applicator 102 will be maintained in a range of 210° F. to 212° F. which is more than ample to exterminate the insects while not adding increased pressure to the steam that would collapse the tunnels.

In operation, valve 107 of the system 100 is opened and heating fuel is applied to the burner 108. The heating fuel is ignited at the burner 108 and the liquid in the boiler is heated. This action may take place before or during transport of the system to the designated area for treatment. Once the fuel is sufficiently heated, the base 101 is lowered on to the ground such that the applicator 102 securely covers the designated area of ground for treatment. The steam from the applicator instantly exterminates any insects, such as fire ants, on the designated ground area surface.

By maintaining the steam at low pressure and temperature and without significant liquid content, the steam released into the applicator 102 will enter the insect tunnel network and completely permeate it. After an appropriate period of time (depending on the size and depth of the nest underground) such as, for example, 15 minutes, the entire colony, including the queens, will be exterminated. The applicator 102 can then be lifted and moved on to the next colony to be exterminated. The application is environmentally friendly and not harmful to humans or animals since only water is used. Of course, care must be taken during usage to prevent burns by contact with any of the apparatus that is hot, but the system is designed for easy and safe operation.

If the designated area to be treated has any grass or plant life growing, the steam will temporarily kill it. However, the grass or plant life will grow back.

Referring to FIG. 2, a side cross-sectional view of a different embodiment 200 of the present invention is presented. The base 201, the applicator 202, the steam transport 203 and the boiler 204 function in the same manner as described for their counterparts in FIG. 1; base 101, applicator 102, steam transport 103 and boiler 104, respectively.

The boiler 204 is equipped with one or more electrodes 208 (instead of a burner) to heat the fuel in the boiler 204. The electrodes 208 are connected to an electrical power source 205, such as a battery or generator, by electrical conduits 206. A switch 207 is used to control the application of electricity to the electrodes 208 from the power source 205. In operation, the system 200 works the same as that described for system 100 except that electrical power is used to heat the fuel in the boiler 204.

Also depicted in FIG. 2 is a simple, manual piece of apparatus for lowering and lifting the base 201 of system 200. A pair of wheels 211 are used to transport the system 200. A control bar 223 in the shape of a three-quarter rectangle has each open end connected to a wheel 211 by a pin 222. The control bar is also pivotally connected to both sides of the base 201 by means of a pivot assembly 221. A hitch 210 is attached to the base 201 for connecting to a tractor, cart, truck or other vehicle and transport the system 200 to designated areas of ground for treatment. When the system is at the designated area, the transporting vehicle may be unhitched. By raising the control bar 223 and back over the system 200, the applicator 202 is lowered on to the designated area of ground for treatment. After the treatment is finished, the control bar is returned to its previous position, thereby raising the applicator and the hitch 210 to be reconnected to the vehicle for further transport.

The control bar 223 may be made of any suitable material and may be a variety of shapes. It is preferable, however, that the control bar 223 be made of a suitable material and a suitable shape, so it is thermally isolated from the boiler and other apparatus such that the operator will not be burned by operating the control bar to raise or lower the system 200.

Referring now to FIG. 3, yet another embodiment of the present invention is depicted as system 300. The base 301, the applicator 302, the steam transport 303, the boiler 304, the burner 308, the conduit 306 and the heating fuel source 305 function in the same manner as described for their counterparts in FIG. 1; base 101, applicator 102, steam transport 103, boiler 104, the burner 108, the conduit 106 and heating fuel source 105, respectively.

The base 301 is part of a frame assembly 309. The base 301, and all apparatus secured thereto, can be lowered to ground level and returned to normal by means of a motor 312 and hydraulic system 313. The frame assembly 309 rides on wheels 311 and is attachable to a vehicle for transportation by means of a hitch 310.

The system 300 also includes a control panel 314 secured to the base 301 by a stem or pedestal 315. The control panel 314 enables the operator to control and monitor the system 300. As depicted in FIG. 3, the control panel may have steam pressure gauge 320 coupled by conduit 324 to a pressure sensor 321 in or on the boiler 304 and for monitoring the steam pressure in the boiler 304. There may also be volume gauge 325 on the control panel 314 coupled to a sensor 322 in the boiler 304 by a conduit 323 for monitoring the level of fuel, such as water, in the boiler 304.

In FIG. 3, valve 307 is an automated valve which can be controlled remotely by a switch or dial 318 via conduit 319. The valve 307 may also be connected to sensor 322 via conduit 323 so that valve 307 is automatically closed if sensor 322 detects a low volume of fuel level in the boiler 304.

Control panel 314 has a switch 316 coupled by conduit 317 to the motor 312 for remotely lowering and raising the base 301. Additional feature may also be added to the control panel 314. For example, a sparking switch (not shown) can be added and coupled to the burner 308, for remotely igniting the fuel at the burner 308.

Thus, the present invention has been described herein with reference to particular embodiments for particular applications. Those having ordinary skill in the art and access to the present teachings will recognize additional modifications, applications, and embodiments within the scope thereof.

It is, therefore, intended by the appended claims to cover any and all such applications, modifications, and embodiments within the scope of the present invention.

What is claimed is:

1. An extermination system for exterminating insects on a designated area of ground and under the designated area of ground utilizing an insect tunnel network and without using a probe, the system comprising:

a boiler with liquid;

a power source for heating the liquid and converting it to steam in the boiler;

a steam transport system for delivering steam from the boiler to an applicator;

an applicator for placement on to and over the designated area of ground such that steam from the boiler is applied on to the designated area and into insect tunnel networks without forcing a probe into the ground;

wherein the steam transport system and the applicator are configured so that the pressure and temperature of the steam is maintained low enough such that, when the applicator is placed on the designated area of ground, the steam will not damage or collapse the insect tunnel networks; and wherein, when the applicator is placed on the designated area of ground, insects on the designated area of ground under the applicator are exterminated directly by the steam and insects underground are exterminated, without the use of a probe, by the steam entering into the tunnel network at the ground surface on the designated area of ground and traveling underground through the tunnel network.

2. The system as set forth in claim 1 wherein the liquid in the boiler is water.

3. The system as set forth in claim 1 further comprising a mechanism for raising and lowering the applicator on and off the designated area of ground.

4. The system as set forth in claim 3 wherein the mechanism for raising and lowering the applicator is thermally isolated from the exterminator such that an operator will not be burned.

5. The system of claim 3 further wherein the mechanism for raising and lowering the applicator on to the designated area of ground is manually operated.

6. The system as set forth in claim 3 wherein the mechanism for manually lowering and raising may be used for transporting the system.

7. The system as set forth in claim 3 further comprising:
power means for automated raising and lowering of the applicator.

8. The system as set forth in claim 1 wherein the system is configured such that a seal is created between the bottom perimeter of the applicator and the ground when the applicator is lowered preventing or minimizing steam from escaping directly into the air.

9. The system as set forth in claim 1 further comprising:
a sensor for sensing the amount of liquid in the boiler.

10. The system as set forth in claim 9 further comprising:
a shut-off device coupled to the sensor for shutting off the power source when the liquid level has dropped to predetermined level.

11. The system as set forth in claim 1 wherein the power source further comprises:
a burner for heating the liquid and converting the liquid into steam; and
a fuel source coupled to the burner for delivering fuel to the burner.

12. The system as set forth in claim 11 further comprising:
an igniter for igniting the fuel at the burner.

13. The system as set forth in claim 12 wherein the fuel is a gas.

14. The system as set forth in claim 1 wherein the power source comprises:
one or more electrically powered electrodes immersed in the boiler for converting the water into steam.

15. The system as set forth in claim 1 further comprising:
system transport means for transporting the system to and from designated areas of ground.

16. The system as set forth in claim 1 further comprising:
a control panel for remotely operating and/or monitoring the system.

17. The system as set forth in claim 1 wherein no insecticidal fog is used.

18. A method of exterminating insects on a designated area of ground and under the designated area of ground utilizing an insect tunnel network and without using a probe with an extermination system, the extermination system having a boiler with liquid; a power source for heating the liquid and converting the liquid to steam; a steam transport system for delivering sufficient volume of steam from the boiler to an applicator; an applicator for placement on to and over the designated area of ground such that steam from the boiler is applied on to the designated area and into insect tunnel networks without forcing a probe into the ground; the method comprising the steps of:
generating steam;
moving the applicator on to the designated area of ground;
transporting the steam to the applicator;
maintaining the pressure and temperature of the steam at a low enough level so that the steam does not collapse or damage the insect tunnel network;
forcing the steam on to the ground and into the insect tunnel network at the ground surface on the designated area of ground, the steam permeating the insect tunnel network and exterminating the insects.

19. The method as set forth in claim 18 further comprising the step of:
transporting the extermination system to and/or from the designated area of ground.

* * * * *